(12) United States Patent
Jirsa et al.

(10) Patent No.: US 10,261,338 B2
(45) Date of Patent: Apr. 16, 2019

(54) EYEWEAR COMPRISING SUSPENSION SYSTEM FOR NOSE AND EARS

(71) Applicant: ADDO INDUSTRIES, LLC, New York, NY (US)

(72) Inventors: Jaclyn Louise Jirsa, New York, NY (US); Debra Forstenzer, Hamilton, NY (US); Odin Cappello, Toronto (CA); Lorenzo Vallone, Chiasso (CH)

(73) Assignee: ADDO INDUSTRIES, LLC, New York, NY (US)

( * ) Notice: Subject to any disclaimer, the term of this patent is extended or adjusted under 35 U.S.C. 154(b) by 0 days.

(21) Appl. No.: 14/995,573

(22) Filed: Jan. 14, 2016

(65) Prior Publication Data

US 2016/0209675 A1    Jul. 21, 2016

Related U.S. Application Data

(60) Provisional application No. 62/103,670, filed on Jan. 15, 2015.

(51) Int. Cl.
*G02C 5/14* (2006.01)
*G02C 5/16* (2006.01)
(Continued)

(52) U.S. Cl.
CPC .............. *G02C 5/143* (2013.01); *G02C 5/06* (2013.01); *G02C 5/16* (2013.01); *G02C 5/18* (2013.01); *G02C 2200/10* (2013.01)

(58) Field of Classification Search
CPC .......... G02C 5/045; G02C 5/143; G02C 5/16; G02C 5/18; G02C 2200/10; G02C 2200/16; G02C 1/06

USPC ...... 351/53, 60, 61, 83, 89, 93, 94, 98, 101, 351/103, 104, 105, 106, 107, 108, 110, 351/117, 122, 123, 126, 128, 129, 130, 351/135, 154, 155, 156
See application file for complete search history.

(56) References Cited

U.S. PATENT DOCUMENTS 233,681 A    10/1880 Landsberg
436,971 A     9/1890 Emons
(Continued)

FOREIGN PATENT DOCUMENTS

EP    0863424 B1    9/1998
GB    2204143       11/1990
(Continued)

OTHER PUBLICATIONS

Technical search Mar. 2014, 2 pages.
(Continued)

*Primary Examiner* — Nicholas R. Pasko
(74) *Attorney, Agent, or Firm* — Dickinson Wright PLLC; Michael E. Noe (57) ABSTRACT

Eyewear may include a frame having a body and temples. The frame may be configured to support and retain optical lenses. A suspension system may be mounted to the frame and configured to suspend the frame away from the user. The suspension system may include a nose suspension and ears suspensions. The nose suspension can be elastic and may be configured to suspend the frame away from the nose of the user. The ears suspensions also can be elastic and configured to suspend the frame away from the head and ears of the user.

15 Claims, 6 Drawing Sheets

(51) Int. Cl.
*G02C 5/06* (2006.01)
*G02C 5/18* (2006.01)

(56) References Cited

U.S. PATENT DOCUMENTS

| | | |
|---|---|---|
| 444,505 A | 1/1891 | Price |
| 460,576 A | 10/1891 | Halbe |
| 527,611 A | 10/1894 | Kirstein |
| 569,462 A | 10/1896 | Meredith |
| 714,664 A | 12/1902 | Briggs |
| 1,017,579 A | 2/1912 | Nicol |
| 1,082,480 A | 12/1913 | Cutler |
| 1,196,083 A | 8/1916 | Clulee |
| 1,210,038 A | 12/1916 | Brennecke |
| 1,238,396 A * | 8/1917 | Elwood .................. G02C 5/02 351/130 |
| 1,663,402 A | 3/1928 | Engel |
| 1,833,792 A | 11/1931 | Pfaus |
| 1,924,951 A | 8/1933 | Marciano |
| 2,534,748 A * | 12/1950 | Willson .................. G02C 7/10 2/442 |
| 3,495,898 A | 2/1970 | Del Vechhio |
| 3,701,591 A | 10/1972 | Wichers |
| D229,974 S | 1/1974 | Wichers et al. |
| 3,944,344 A * | 3/1976 | Wichers .................. G02C 1/04 351/41 |
| 4,012,130 A | 3/1977 | Guillet |
| 4,026,640 A | 5/1977 | Everburg |
| 4,152,051 A | 5/1979 | Van Tiem |
| 4,240,718 A * | 12/1980 | Wichers ................ G02C 3/003 351/111 |
| 4,322,138 A * | 3/1982 | Minart .................... A42B 3/04 351/133 |
| D264,476 S | 5/1982 | Stensager |
| 4,377,328 A | 3/1983 | Ferrandi |
| 4,389,102 A * | 6/1983 | Piampiano ............ G02C 3/003 351/123 |
| 4,506,961 A | 3/1985 | Palmieri |
| 4,616,367 A | 10/1986 | Jean |
| 4,652,098 A | 3/1987 | Anger |
| 4,684,226 A | 8/1987 | Anger |
| 4,712,893 A | 12/1987 | Anger |
| 4,740,069 A | 4/1988 | Baum |
| 4,755,042 A * | 7/1988 | Anger .................... G02C 5/143 351/113 |
| 4,802,753 A | 2/1989 | Lhospice |
| 4,813,776 A | 3/1989 | Borsos |
| 4,820,034 A | 4/1989 | Anger |
| 4,885,808 A | 12/1989 | Carpenter |
| 4,924,245 A | 5/1990 | Dianitsch |
| 4,925,291 A * | 5/1990 | Anger .................... G02C 5/143 351/117 |
| 5,087,117 A | 2/1992 | Steinwachs |
| D325,590 S | 4/1992 | Galy |
| 5,315,328 A | 5/1994 | Hofmair et al. |
| D349,508 S | 8/1994 | Conway |
| 5,398,377 A | 3/1995 | Takiyama |
| 5,418,581 A | 5/1995 | Conway |
| 5,422,685 A | 6/1995 | Conway |
| 5,426,473 A | 6/1995 | Riehm |
| 5,440,356 A | 8/1995 | Fukuwa |
| 5,469,232 A | 11/1995 | Ichimura |
| 5,570,492 A | 11/1996 | Nakanishi |
| 5,579,062 A | 11/1996 | Sondrol |
| 5,583,586 A * | 12/1996 | Evans .................. G02C 3/003 351/130 |
| 5,596,789 A | 1/1997 | Simioni |
| 5,606,743 A | 2/1997 | Vogt et al. |
| 5,631,718 A | 5/1997 | Markovitz |
| 5,631,719 A | 5/1997 | Chao |
| 5,642,178 A | 6/1997 | Leonardi et al. |
| 5,666,181 A | 9/1997 | Conway |
| 5,684,559 A | 11/1997 | Lin |
| 5,729,321 A | 3/1998 | Wielhouwer |
| 5,732,444 A | 3/1998 | Horikawa et al. |
| 5,739,891 A | 4/1998 | Wei |
| 5,739,892 A | 4/1998 | Kobayashi |
| 5,745,952 A | 5/1998 | Baragar et al. |
| 5,764,330 A | 6/1998 | Simioni |
| D397,137 S | 8/1998 | Markovitz |
| 5,790,229 A | 8/1998 | Poloni |
| 5,791,015 A | 8/1998 | Wandinger |
| 5,801,804 A | 9/1998 | Pennise |
| 5,801,806 A | 9/1998 | DiChiara |
| 5,818,566 A | 10/1998 | Carlon et al. |
| 5,818,567 A | 10/1998 | Sakai |
| 5,818,568 A | 10/1998 | Onaga et al. |
| 5,844,655 A | 12/1998 | Chang |
| 5,847,801 A | 12/1998 | Masunaga |
| 5,894,336 A | 4/1999 | Baldissarutti |
| 5,898,471 A | 4/1999 | Simioni et al. |
| 5,903,332 A | 5/1999 | Devercelli |
| 5,963,296 A | 10/1999 | Matera |
| 5,971,539 A | 10/1999 | Kobayashi |
| 5,980,039 A | 11/1999 | Schmid et al. |
| 5,984,472 A | 11/1999 | Kobayashi |
| 6,000,797 A | 12/1999 | Ichihashi |
| 6,050,685 A | 4/2000 | Lin |
| 6,050,686 A | 4/2000 | De Rossi |
| 6,059,410 A | 5/2000 | Wang |
| 6,089,709 A | 7/2000 | Fairclough |
| 6,099,120 A | 8/2000 | De Lima |
| D431,042 S | 9/2000 | Lin |
| 6,139,143 A | 10/2000 | Brune et al. |
| 6,193,368 B1 | 2/2001 | George |
| 6,210,004 B1 | 4/2001 | Horikawa et al. |
| 6,217,170 B1 | 4/2001 | Hsiao |
| 6,234,628 B1 | 5/2001 | Friedman |
| 6,238,048 B1 | 5/2001 | Fukuoka |
| 6,244,704 B1 | 6/2001 | Xiao |
| 6,254,235 B1 | 7/2001 | Hsieh Yeh |
| 6,260,965 B1 | 7/2001 | Kroman et al. |
| 6,296,355 B1 | 10/2001 | Rittmann |
| 6,302,539 B1 | 10/2001 | Tsai |
| 6,357,874 B1 | 3/2002 | Miyazawa |
| 6,412,944 B1 | 7/2002 | Huang et al. |
| 6,422,699 B2 | 7/2002 | Kobayashi |
| 6,481,053 B2 | 11/2002 | Desbiez-Piat |
| 6,494,574 B2 | 12/2002 | Ebata |
| 6,540,351 B1 | 4/2003 | Meiler |
| 6,575,570 B2 | 6/2003 | Mauri |
| 6,585,372 B1 | 7/2003 | Nagayoshi |
| 6,588,895 B2 | 7/2003 | Pointet |
| 6,752,496 B2 | 6/2004 | Conner |
| 6,755,523 B1 | 6/2004 | Wiedner |
| 6,779,887 B2 | 8/2004 | Meiler |
| 6,786,594 B1 | 9/2004 | Lucas et al. |
| 6,935,740 B1 | 8/2005 | Chang |
| 6,948,811 B2 | 9/2005 | Kroman |
| 7,011,406 B1 | 3/2006 | Kim |
| 7,018,038 B2 * | 3/2006 | Yoshida ................ G02C 3/003 351/111 |
| 7,029,115 B2 | 4/2006 | Toulch |
| 7,080,904 B2 | 7/2006 | Jobin et al. |
| 7,090,347 B1 | 8/2006 | Rotman |
| 7,101,039 B2 | 9/2006 | Maling |
| 7,175,270 B2 | 2/2007 | Curci |
| 7,175,276 B1 | 2/2007 | Hsiung |
| 7,210,777 B2 | 5/2007 | Canavan |
| 7,237,892 B2 | 7/2007 | Curd et al. |
| 7,246,901 B2 | 7/2007 | Curci |
| 7,284,853 B2 | 10/2007 | Friedman |
| 7,344,242 B2 | 3/2008 | Habermann |
| 7,410,253 B2 | 8/2008 | Habermann |
| 7,422,322 B2 | 9/2008 | He |
| 7,441,890 B2 | 10/2008 | Chung |
| 7,472,990 B2 | 1/2009 | Chen |
| 7,484,844 B2 | 2/2009 | Spandl |
| 7,497,571 B2 | 3/2009 | Rossin |
| 7,513,617 B1 | 4/2009 | Alford |
| 7,540,608 B2 | 6/2009 | Carlon |
| 7,543,931 B2 | 6/2009 | Proksch |
| 7,553,013 B2 | 6/2009 | Tsai |
| D598,041 S | 8/2009 | Corcagnani |

(56) References Cited

U.S. PATENT DOCUMENTS

| | | | |
|---|---|---|---|
| D598,042 S | 8/2009 | Corcagnani | |
| 7,604,347 B2 | 10/2009 | Gottschling et al. | |
| 7,621,633 B1 | 11/2009 | Foster | |
| 7,628,484 B2 | 12/2009 | Lamontagne | |
| 7,637,609 B1 | 12/2009 | Ifergan | |
| 7,645,040 B2 | 1/2010 | Habermann | |
| 7,695,133 B2 | 4/2010 | Bondet | |
| 7,703,913 B2 | 4/2010 | Huang | |
| 7,703,914 B2 | 4/2010 | Maling | |
| 7,712,894 B2 | 5/2010 | Tsai | |
| 7,712,896 B1 | 5/2010 | Lee | |
| 7,744,212 B2 | 6/2010 | Panisset | |
| 7,758,789 B2 | 7/2010 | Curci | |
| 7,794,080 B2 | 9/2010 | Zelazowski | |
| 7,815,306 B2 | 10/2010 | Xiao | |
| 7,883,205 B2 * | 2/2011 | Begg | G02C 1/04 351/103 |
| 7,900,281 B2 | 3/2011 | Wozniak | |
| 7,997,722 B2 | 8/2011 | Gottscling et al. | |
| 8,020,988 B2 | 9/2011 | Ogren et al. | |
| 8,029,133 B2 | 10/2011 | Chen | |
| 8,038,291 B2 | 10/2011 | Chen | |
| 8,042,939 B2 | 10/2011 | Le Duy | |
| 8,083,345 B2 | 12/2011 | Chen | |
| 8,087,775 B2 | 1/2012 | Dollay | |
| 8,142,012 B2 | 3/2012 | Radmard et al. | |
| 8,177,360 B2 | 5/2012 | Sierra et al. | |
| 8,192,017 B2 | 6/2012 | Chen | |
| 8,256,894 B2 | 9/2012 | Ifergan | |
| 8,282,208 B2 | 10/2012 | Li | |
| 8,292,425 B2 | 10/2012 | Takeshi | |
| 8,353,593 B2 | 1/2013 | Senatore et al. | |
| 8,371,692 B2 | 2/2013 | LaGace et al. | |
| 8,414,120 B2 | 4/2013 | Cheong | |
| 8,894,200 B2 | 11/2014 | Jirsa | |
| 9,188,795 B1 * | 11/2015 | Chin | G02C 5/16 |
| 2001/0048504 A1 | 12/2001 | Joo | |
| 2003/0020867 A1 | 1/2003 | Dei Negri et al. | |
| 2004/0105068 A1 * | 6/2004 | Wiedner | G02C 3/003 351/106 |
| 2004/0130675 A1 | 7/2004 | Einarsson | |
| 2004/0207806 A1 | 10/2004 | Kerjean | |
| 2005/0225717 A1 | 10/2005 | Reane | |
| 2005/0243271 A1 | 11/2005 | Oura et al. | |
| 2005/0251960 A1 | 11/2005 | Kanou et al. | |
| 2008/0013040 A1 | 1/2008 | Anderl | |
| 2008/0266517 A1 | 10/2008 | Reane | |
| 2009/0225271 A1 | 9/2009 | Radmard et al. | |
| 2010/0097565 A1 | 4/2010 | Ifergan | |
| 2010/0118259 A1 | 5/2010 | Conti | |
| 2011/0176101 A1 | 7/2011 | Dighton | |
| 2011/0304814 A1 | 12/2011 | Wong | |
| 2012/0002158 A1 | 1/2012 | Jirsa | |
| 2012/0026452 A1 | 2/2012 | Delamour et al. | |
| 2012/0236253 A1 | 9/2012 | Altemare, Jr. et al. | |
| 2012/0307197 A1 | 12/2012 | Haffmans et al. | |
| 2012/0307198 A1 | 12/2012 | Ifergan | |
| 2012/0327360 A1 | 12/2012 | Lin | |
| 2013/0003012 A1 | 1/2013 | Tsai | |
| 2013/0033675 A1 | 2/2013 | Cheong | |
| 2013/0044288 A1 | 2/2013 | Cheng | |
| 2013/0201438 A1 | 8/2013 | Gasparetto | |
| 2013/0342804 A1 * | 12/2013 | Cargnel | G02C 5/006 351/114 |
| 2014/0132911 A1 * | 5/2014 | Yoshida | G02C 5/20 351/118 |
| 2015/0042946 A1 | 2/2015 | Jirsa | |

FOREIGN PATENT DOCUMENTS

| | | | | |
|---|---|---|---|---|
| GB | 2204143 B | * | 11/1990 | G02C 3/003 |
| GB | 2204143 B | * | 11/1990 | G02C 3/003 |
| GB | 2288883 A | * | 11/1995 | G02C 3/003 |
| GB | 2288883 A | * | 11/1995 | G02C 3/003 |

OTHER PUBLICATIONS

Cathy, "Headband Eyewear for Those Not Worried About Hat Hair," <http://theopticalvisionsite.com/opti-fun/headband-eyewear-for-those-not-worried-about-hat-hair/>, Source: Gizmodo, dated Feb. 10, 2010, printed Jun. 3, 2011, 1 page.

* cited by examiner

FIG. 14

EYEWEAR COMPRISING SUSPENSION SYSTEM FOR NOSE AND EARS

CROSS-REFERENCE TO RELATED APPLICATION(S)

This application claims priority to and the benefit of U.S. Prov. App. No. 62/103,670, filed on Jan. 15, 2015, and is incorporated herein by reference in its entirety.

BACKGROUND OF THE INVENTION

Field of the Disclosure

The present application relates in general to eyewear and, in particular, to a system and apparatus for more comfortable eyewear.

SUMMARY

Embodiments of a system and apparatus for eyewear are disclosed. For example, the eyewear may include a frame having a body and temples. The frame may be configured to support and retain optical lenses. A suspension system may be mounted to the frame and configured to suspend the frame away from the user.

Some embodiments of the suspension system may include a nose suspension and ears suspensions. The nose suspension can be elastic and may be configured to suspend the frame away from the nose of the user. The ears suspensions also can be elastic and configured to suspend the frame away from the head and ears of the user.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system and apparatus for eyewear are disclosed. For example, some embodiments are depicted in FIGS. 1-7B, as eyewear 21. Other embodiments are depicted in FIGS. 8-14, as eyewear 121. For ease of reference, the embodiments share many analogous elements, as represented by the reference numerals: "xx" for FIGS. 1-7B (e.g., eyewear 21), and "1xx" for FIGS. 8-14 (e.g., eyewear 121). Other elements share analogous number pairings.

Eyewear 21 may include a frame 23 having a body 25 and temples 27. The frame 23 may be configured to support and retain optical lenses 29. Embodiments of the eyewear 21 may be customizable with respect to temple length, contour and pupillary distance.

Eyewear 21 may comprise a suspension system 31 mounted to the frame 23, and may be configured to suspend the frame 23 away from a user thereof. Embodiments of the suspension system 31 may include a nose suspension 33 (FIG. 3) and ears suspensions 35. The nose suspension 33 can be elastic and may be configured to suspend the frame 23 away from a nose of the user. The ears suspensions 35 can be elastic and configured to suspend the frame 23 away from the head and ears of the user.

Embodiments of the suspension system 31 may include a material having a selected modulus of elasticity. For example, the material may include silicone with hypoallergenic properties, such as silicone bands. Versions with silicon can be more resilient, break-resistant, non-slip, moisture-resistant and may have increased durability. In other examples, the suspension system can include at least one of silicone, transpiring polymer (e.g., water absorbing), harmonic spring (FIG. 7B), fabric, guitar strings and rubber.

In still other embodiments, the lenses 29 may include adjustable prescription lenses that may employ liquid silicon to set the prescription. Similarly, the eyewear 21, such as nose and ear suspensions 33, 35, may comprise carriers of liquid silicon. In another example, the eyewear 21, such as nose and ear suspensions 33, 35, may contain communication and/or smart technology, such as Bluetooth technology, Wi-Fi, fitness tracking, projection technology, illumination and/or other forms of data recording, transmission equipment, etc.

Examples of the suspension system may include a material having a selected hardness, such as AISI 304 stainless steel, which may be useful for soldering purposes. In some versions, the suspension system may comprise a selected tension.

Embodiments of the nose suspension 33 may not include nose pads or frames with built-in nose support without padding. Embodiments of the ears suspension may not comprise temple end paddles. The nose suspension 33 may be configured to distribute a weight of the eyewear 21 over, for example, a nasal bone dorsum and lateral nasal area of the user. The nose suspension may be configured to distribute a weight of the eyewear above and displaced away from the nasal bone dorsum and lateral nasal area of the user.

In some embodiments, the nose suspension comprises two flexible elastic bands 37. For example, the two flexible elastic bands 37 may cross to form an x-pattern. The two flexible bands 37 can be independent and make contact with each other, but are not necessarily joined together. Embodiments of the two flexible bands 37 can be at least one of joined, welded, woven and webbed to frame 23 and/or together.

Figure 1:
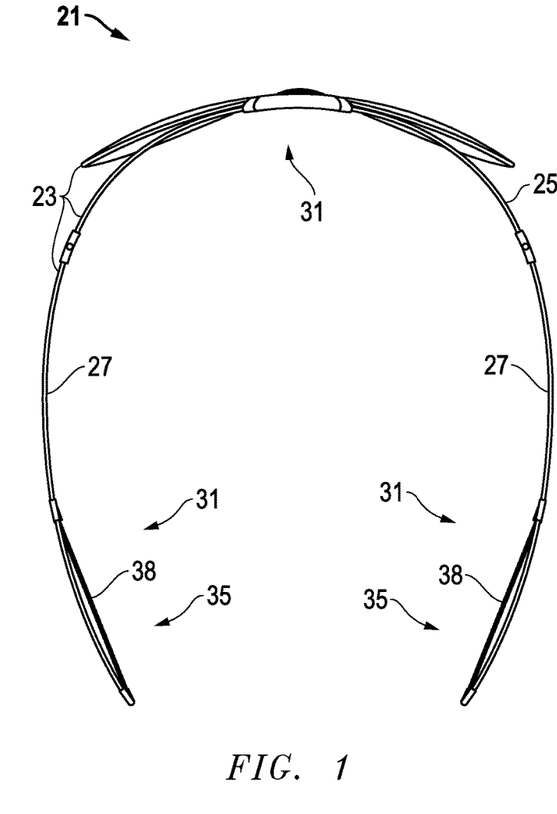
FIG. 1 is a top view of an embodiment of eyewear.
Figure 2:
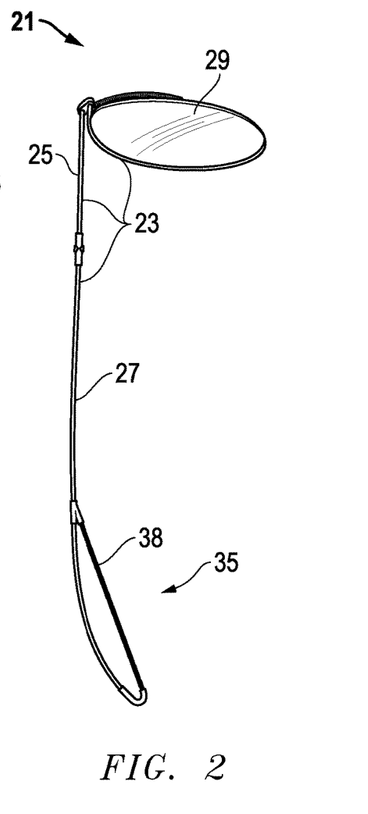
FIG. 2 is a side view of the embodiment of eyewear of FIG. 1.
Figure 3:
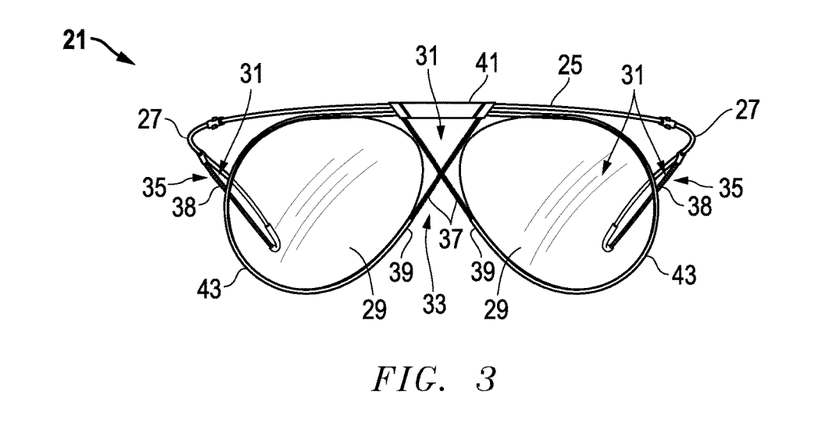
FIG. 3 is a front view of the embodiment of eyewear of FIG. 1.
Figure 4:
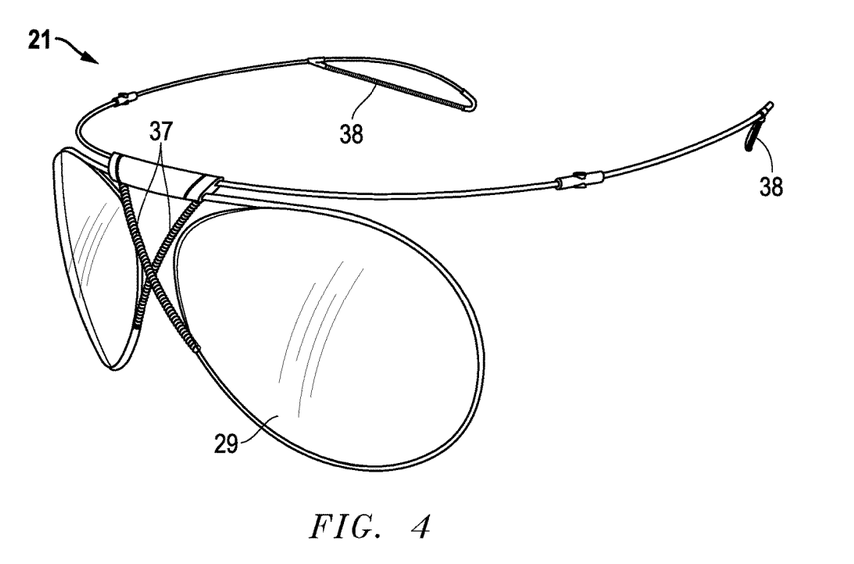
FIG. 4 is an isometric view of the embodiment of eyewear of FIG. 1.
Figure 5:
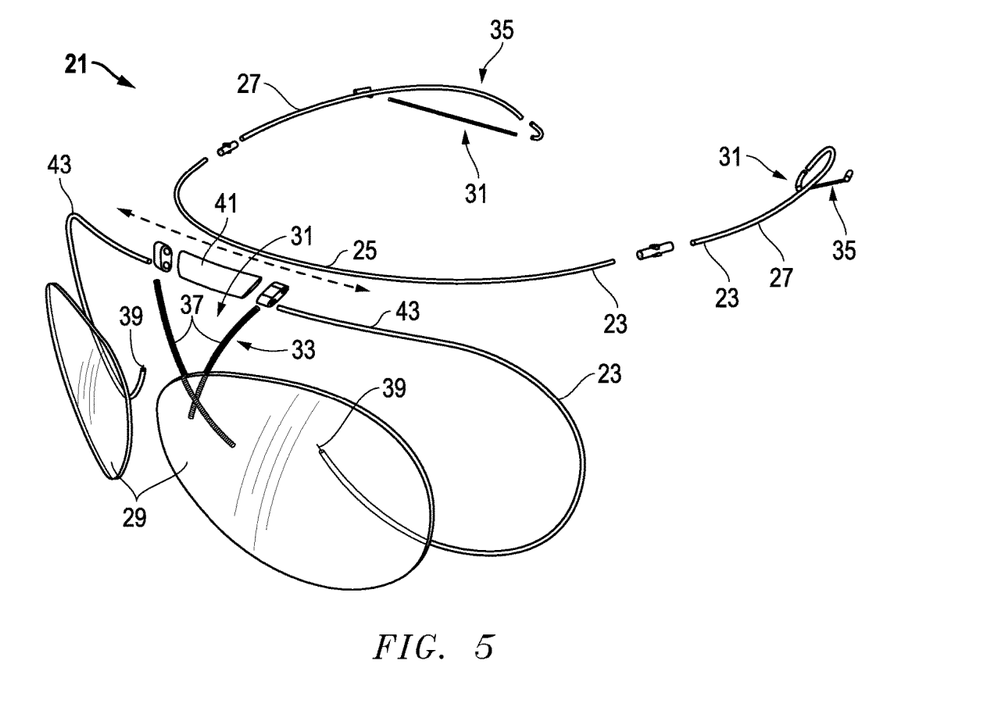
FIG. 5 is an exploded isometric view of the embodiment of eyewear of FIG. 1.
Figure 6:
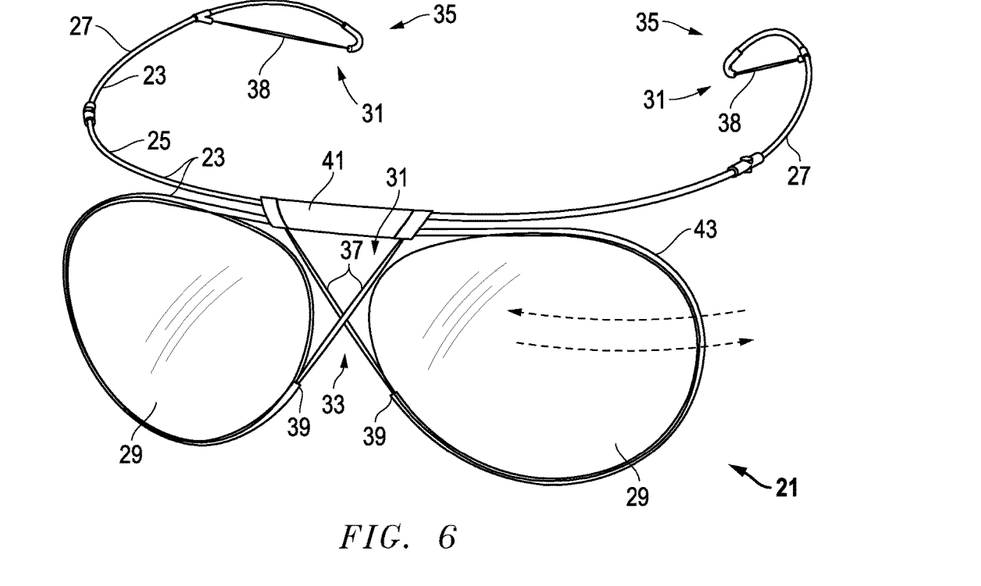
FIG. 6 is another isometric view of the embodiment of eyewear of FIG. 1.
Figure 7A:
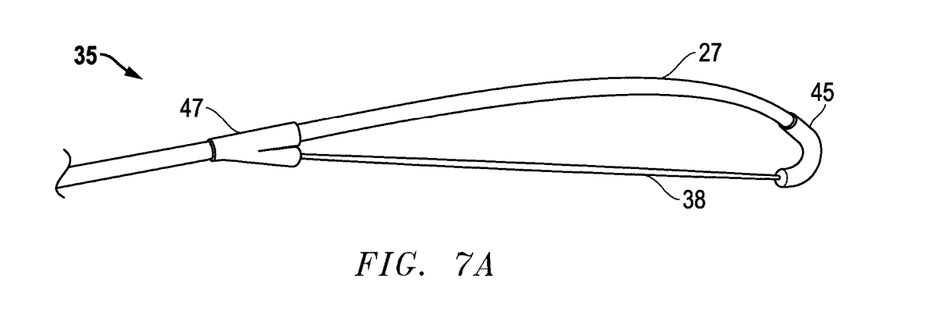
FIGS. 7A and 7B are side views of embodiments of temple portion options for the eyewear of FIG. 1.
Figure 7B:
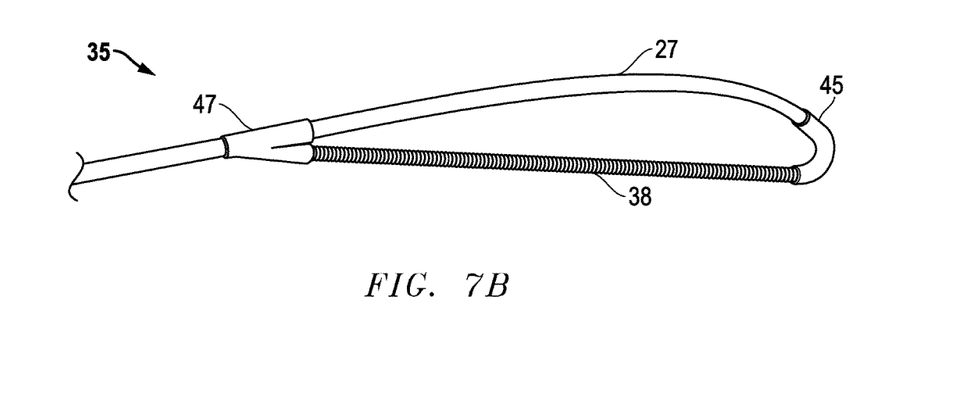
Figures 8, 9:
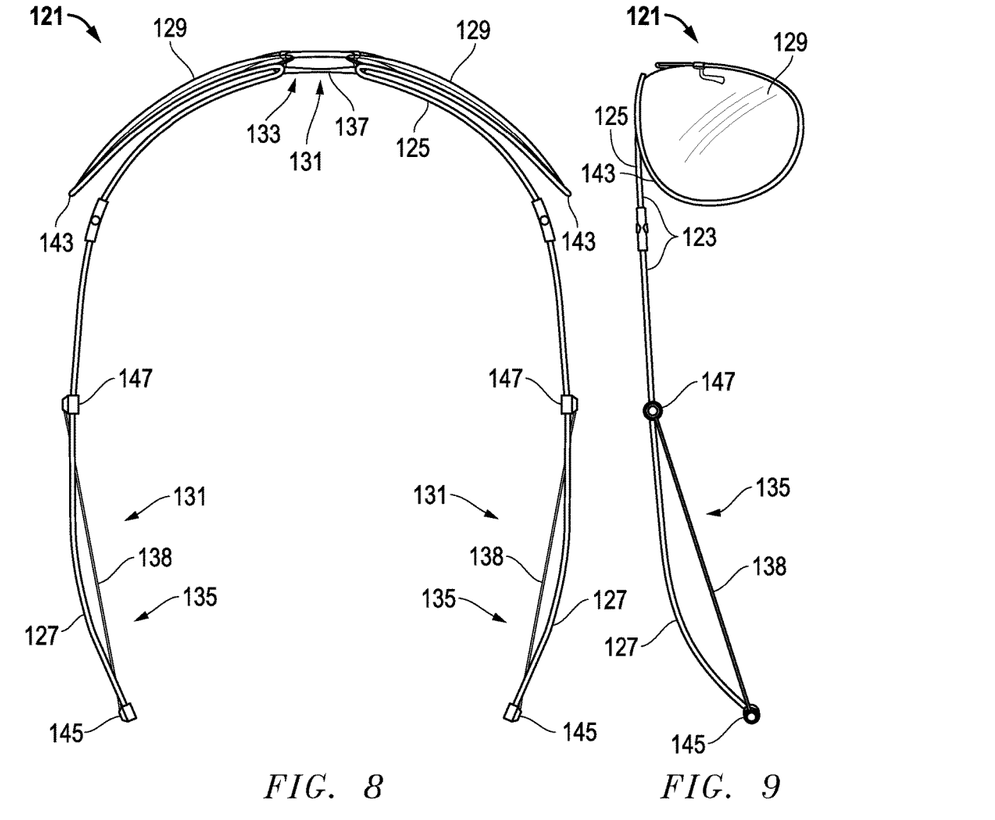
FIG. 8 is a top view of another embodiment of eyewear.
FIG. 9 is a side view of the embodiment of eyewear of FIG. 8.

Embodiments of one end of each flexible band 37 may be mounted and substantially tangent to a curved lens support 39 (FIG. 3). A second end of each flexible band 37 can be mounted to a bracket 41 that couples the optical lenses 29 to the body 25. The curved lens support 39 may include a single curved wire 43 for both optical lenses 29. The bracket 41 may be used to couple a center of the single curved wire 43 to a center of the body 25.

Another version of the curved lens support 39 may include a pair of curved wires 43, each of which can support one of the optical lenses 29. The bracket 41 may include an assembly that centrally couples the pair of curved wires 43 to a center of the body 25. The pair of curved wires 43 can be laterally adjustable (see arrows in FIGS. 5 and 6) relative to the bracket 41 to adjust a width of separation between the optical lenses 29.

Alternatively, the nose suspension 33 can include a single flexible band or a webbing of flexible bands (not shown). The single flexible band may be contoured to a shape of the nose of the user to form a bridge therefor.

In other examples, the nose suspension 33 and the ears suspensions 35 may comprise flexible elastic bands 37, 38, as shown. In some versions, each flexible elastic band 37, 38 can have an axially sectional shape that is at least one of cylindrical, flat, triangular and woven. In other versions, each flexible elastic band 37, 38 can have a non-uniform cross-sectional shape. Embodiments of each flexible elastic band 37, 38 can be thickest at an approximate center thereof, and taper down in thickness toward each end thereof. In another example, each flexible elastic band 37, 38 is thickest and most substantial where it attaches to a respective portion of the frame 23. The flexible elastic bands 37, 38 may be identical to each other, or differ from each other in one or more aspects or properties.

Embodiments of the nose suspension 33 can be flexible (FIGS. 5 and 6) with respect to bridge width and height. For example, customization may include the flexible elastic material to suspend itself above each individual's variable anatomic structure. Cut-outs in the lenses 29 may be employed to allow the entire x-shaped suspension to shift up and down, but the bands 37, 38 do not necessarily change their tension.

In some versions, each ear suspension 35 may include a single flexible elastic band 38. Each ear suspension 35 may include flexible parallel segments. In some versions, each ear suspension 35 may comprise one or more of a flexible band, weaving and/or webbing. For example, each ear suspension 35 may enclose and surround a portion of a respective temple 27, such that each ear suspension 35 forms a loop or continuous loop attachment on a respective temple 27. One end of the loop attachment may include a tube 45 (FIG. 7A) that receives an end of the respective temple 27. An opposite end of the loop attachment may include a hoop 47 mounted to an arm of a respective temple 27. In some versions, a position of the hoop 47 is adjustable along a length of the temple 27.

Embodiments of the ears suspensions 35 may be formed from a single material. In other versions, the ears suspensions 35 may be formed from a plurality of materials. For example, each ear suspension 35 may include a flexible elastic band 38, and a pair of elastic anchors mounted to a respective one of the temples 27. A first one of the elastic anchors (not shown) of each ear suspension 35 may be a first tube mounted to the respective one of the temples 27, and a second tube that anchors an end of the flexible elastic band 38. A second one of the elastic anchors of each ear suspension 35 may include a single tube having one end mounted to a tip of the respective one of the temples 27, and a second end that anchors an end of the flexible elastic band 38.

Referring now to FIGS. 8-14, eyewear 121 may include ear suspensions 135 that may extend from an arm of one of the temples 127 to a respective temple tip end. The ear suspensions 135 can be stationary, such that they are not adjustable. One end 145 of each ear suspension 135 may be anchored to the respective temple tip end 136. An opposite end 147 of each ear suspension 135 can be slidably adjustable along a length of said arm of one of the temples 127. Said one end 145 of each ear suspension may include a blind hole in which said respective temple tip end mounts. The opposite end 147 of each ear suspension 135 may include a hole through which said arm of one of the temples 127 extends. The opposite end 147 of each ear suspension 135 may be configured to be maintained at a selected position on said arm of one of the temples 127 by friction.

Figure 10:
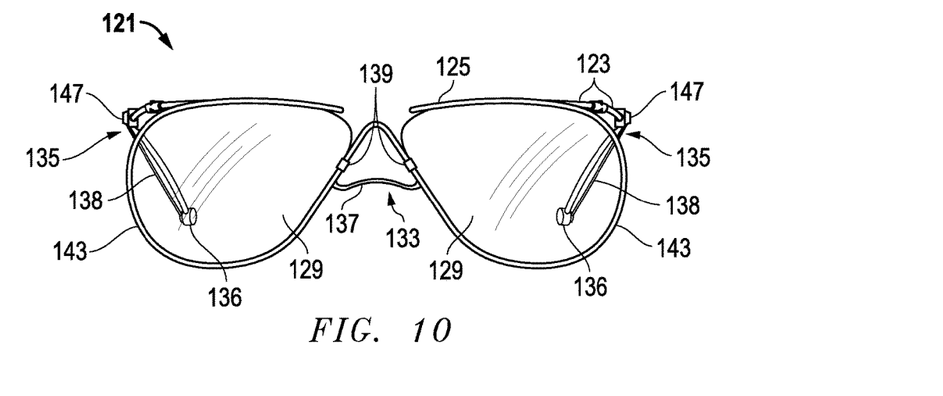
FIG. 10 is a front view of the embodiment of eyewear of FIG. 8.
Figure 11:
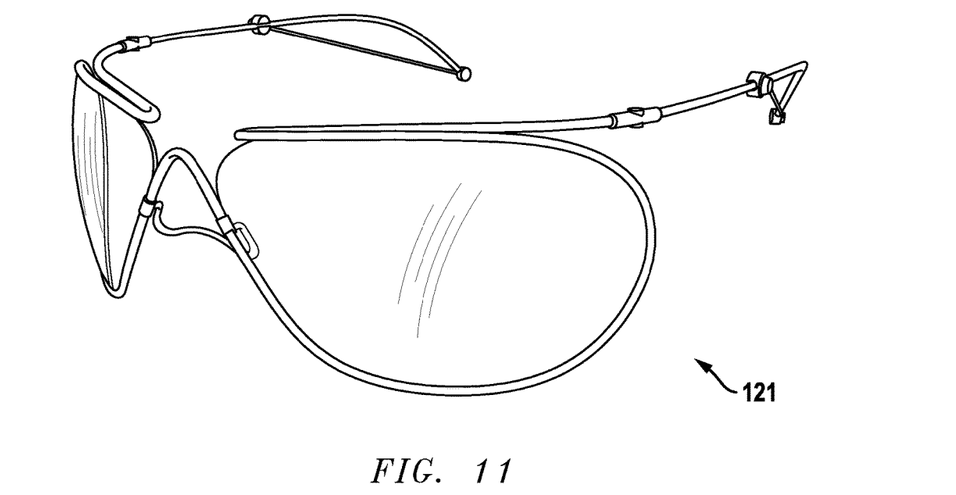
FIG. 11 is an isometric view of the embodiment of eyewear of FIG. 8.
Figure 12:
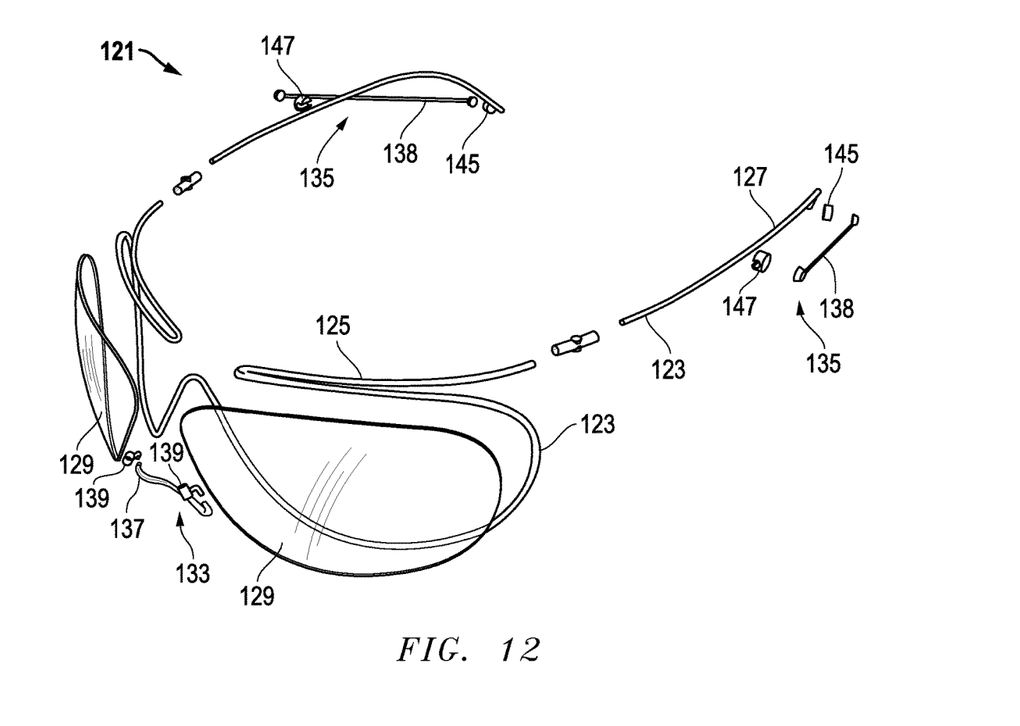
FIG. 12 is an exploded isometric view of the embodiment of eyewear of FIG. 8.
Figure 13:
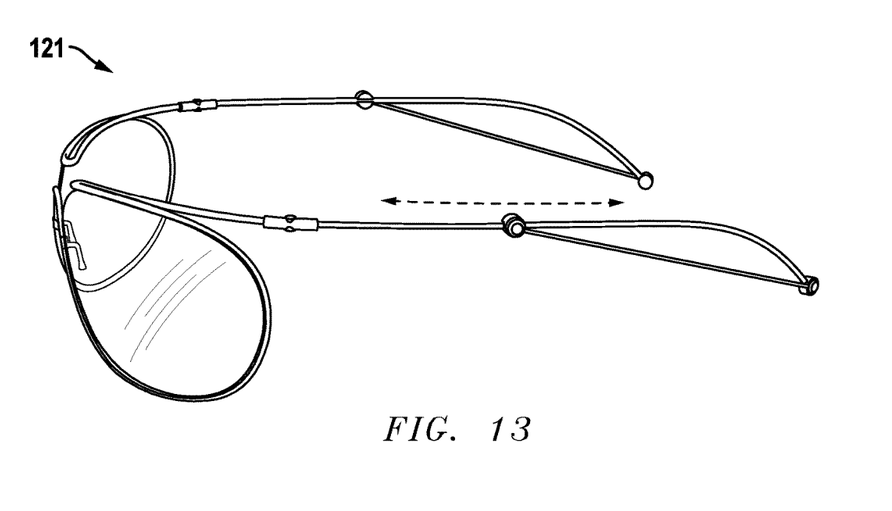
FIG. 13 is another isometric view of the embodiment of eyewear of FIG. 8.
Figure 14:
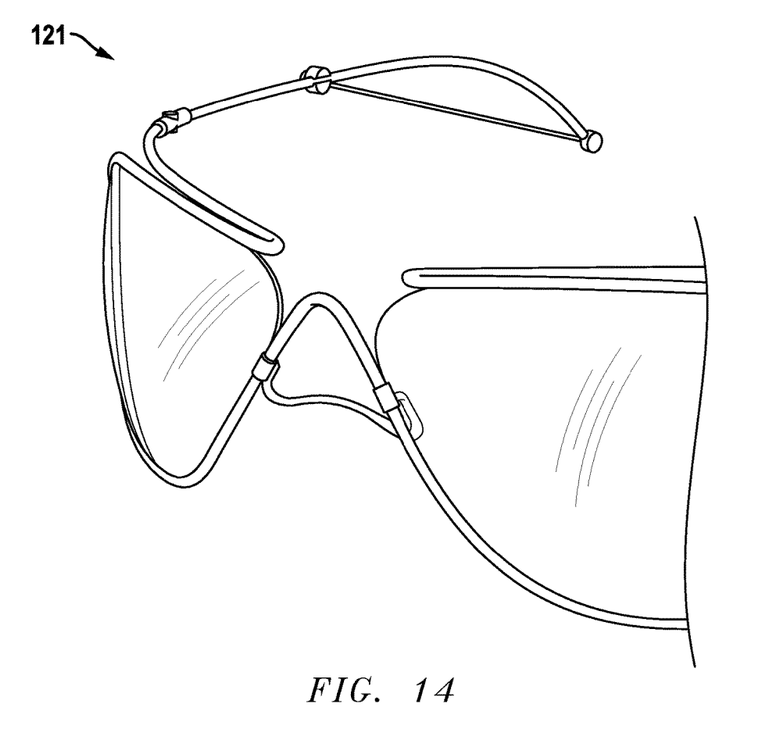
FIG. 14 is an enlarged isometric view of a front portion of embodiment of eyewear of FIG. 8.

Embodiments of the frame 123 may be formed from a single material. Versions of the frame 123 may include a plurality of segments that are coupled together. The body 125 can be formed from a single tube or wire that is coupled to a respective one of the temples 127 on each end. The single tube or wire can be configured to support and retain the optical lenses 129 at upper and lower ends thereof. The single tube or wire may be configured to cross above the nose of the user only once at lower ends thereof, but not the upper ends thereof, as illustrated in FIG. 10.

Versions of the frame 123 may include a dual bridge frame system (not shown) having an interior structure that is adjustable relative to a head size of a user. An exterior structure may be formed from a different material than the interior structure and may be more rigid and stable than the interior structure. The interior structure may include the body 125 and temples 127. The exterior structure may include a second frame configured to bridge, support and retain the optical lenses 129. The nose suspension 133 may be configured to be mounted to the second frame.

In some versions, the first frame that is higher allows the eyewear 121 to be fixed to the forehead (front face), and can be fixed over the entire frontal area and on the ears. At the end of the temples 127, the ear suspensions 135 allow a weight reduction of the temples 127 on the ears and, at the same time, can ease the pressure thereof. A metal may be used for the frame 123, such as AISI 304 stainless steel, that is elastic enough to facilitate the eyewear frame 123 to better follow the shape of the forehead of the user while worn. A second part of the frame 123 may be fixed to the first, such that it does not touch the head of the user. The lenses 129 may be attached to this second part of the frame 123, along with the nose suspension 135.

In some embodiments, the optical lenses 129 may be bridged away from the body 125, such that they do not touch the body 125, except where they are coupled and suspended downward from a center of the body 125. The nose suspension 133 may be configured to be mounted directly to the lenses 129. Embodiments of the eyewear 121 may be designed to better distribute the weight of the eyewear 121 on the head of a user, and reduce the stress on the nose of the user by the entire weight of the eyewear 121. The frame 123 also may be configured to allow the weight and pressure of the eyewear 121 to be distributed on the forehead, temples and ears and nose of the user.

Still other versions may include one or more of the following embodiments:

Claim 1. Eyewear, comprising:
  a frame having a body and temples, and the frame is configured to support and retain optical lenses; and
  a suspension system mounted to the frame and configured to suspend the frame away from a user thereof, the suspension system comprising a nose suspension and ears suspensions, wherein the nose suspension is elastic and is configured to suspend the frame away from a nose of the user, and the ears suspensions are elastic and configured to suspend the frame away from the head and ears of the user.

2. The eyewear of claim 1, wherein the suspension system comprises at least one of silicone, transpiring polymer, harmonic spring, fabric, guitar strings or rubber.

3. The eyewear of claim 1, wherein the nose suspension does not comprise nose pads or frames with built-in nose support without padding, and the ears suspension does not comprise temple end paddles.

4. The eyewear of claim 1, wherein the nose suspension is configured to distribute a weight of the eyewear over a nasal bone dorsum and lateral nasal area of the user.

5. The eyewear of claim 1, wherein the nose suspension is configured to distribute a weight of the eyewear above and displaced away from a nasal bone dorsum and lateral nasal area of the user.

6. The eyewear of claim 1, wherein the nose suspension comprises two bands that are flexible and elastic.

7. The eyewear of claim 6, wherein the two bands cross to form an x-pattern.

8. The eyewear of claim 6, wherein the two bands are independent and make contact but are not joined together.

9. The eyewear of claim 6, wherein the two bands are at least one of joined, welded, woven or webbed together.

10. The eyewear of claim 6, wherein one end of each band is mounted and substantially tangent to a curved lens support, and a second end of each band is mounted to a bracket that is configured to couple the optical lenses to the body.

11. The eyewear of claim 10, wherein the curved lens support comprises a single curved wire for both optical lenses, and the bracket couples a center of the single curved wire to a center of the body.

12. The eyewear of claim 10, wherein the curved lens support comprises a pair of curved wires, each of which supports one of the optical lenses, and the bracket comprises an assembly that centrally couples the pair of curved wires to a center of the body.

13. The eyewear of claim 12, wherein the pair of curved wires is laterally adjustable relative to the bracket, such that they are configured to adjust a width of separation between the optical lenses.

14. The eyewear of claim 1, wherein the nose suspension comprises a single flexible band or a webbing of flexible bands.

15. The eyewear of claim 14, wherein the single flexible band is contoured to a shape of the nose of the user to form a bridge therefor.

16. The eyewear of claim 1, wherein the nose suspension and the ears suspensions comprise bands that are flexible and elastic.

17. The eyewear of claim 16, wherein each band has a shape that is at least one of cylindrical, flat, triangular or woven.

18. The eyewear of claim 16, wherein each band has a non-uniform cross-sectional shape.

19. The eyewear of claim 16, wherein each band is thickest at an approximate center thereof, and tapers down in thickness toward each end thereof.

20. The eyewear of claim 16, wherein each band is thickest and most substantial where it attaches to a respective one of the temples.

21. The eyewear of claim 1, wherein the nose suspension is flexible with respect to bridge width and height.

22. The eyewear of claim 1, wherein each ear suspension comprises a single flexible elastic band.

23. The eyewear of claim 1, wherein each ear suspension comprises flexible parallel segments.

24. The eyewear of claim 1, wherein each ear suspension comprises at least one of a flexible band, weaving or webbing, and each ear suspension encloses and surrounds a portion of a respective temple, such that each ear suspension forms a loop attachment on said respective temple.

25. The eyewear of claim 24, wherein one end of the loop attachment comprises a tube that receives an end of the respective temple, and an opposite end of the loop attachment comprises a hoop mounted to an arm of the respective temple.

26. The eyewear of claim 25, wherein a position of the hoop is adjustable along a length of the arm.

27. The eyewear of claim 1, wherein the eyewear is customizable with respect to temple length, contour and pupillary distance.

28. The eyewear of claim 1, wherein the ears suspensions are formed from a single material.

32. The eyewear of claim 1, wherein the ears suspensions are formed from a plurality of materials.

33. The eyewear of claim 1, wherein each ear suspension comprises a band that is flexible and elastic, and a pair of elastic anchors mounted to a respective one of the temples.

34. The eyewear of claim 33, wherein a first one of the elastic anchors of each ear suspension comprises a first tube mounted to the respective one of the temples, and a second tube that anchors an end of the band, and a second one of the elastic anchors of each ear suspension comprises a single tube having one end mounted to a tip of the respective one of the temples, and a second end that anchors an end of the band.

35. The eyewear of claim 1, wherein each ear suspension extends from an arm of one of the temples to a respective temple tip end.

36. The eyewear of claim 35, wherein the ear suspensions are stationary and are not adjustable.

37. The eyewear of claim 35, wherein one end of each ear suspension is anchored to said respective temple tip end, and an opposite end of each ear suspension is slidably adjustable along a length of said arm of one of the temples.

38. The eyewear of claim 37, wherein said one end of each ear suspension comprises a blind hole in which said respective temple tip end mounts, and said opposite end of each ear suspension comprises a hole through which said arm of one of the temples extends, and said opposite end of each ear suspension is configured to be maintained at a selected position on said arm of one of the temples by friction.

39. The eyewear of claim 1, wherein the frame is formed from a single material.

40. The eyewear of claim 1, wherein the frame comprises a plurality of segments that are coupled together.

41. The eyewear of claim 1, wherein the body is formed from a single tube or wire that is coupled to a respective one of the temples on each end, the single tube or wire is configured to support and retain the optical lenses at upper and lower ends thereof, and the single tube or wire is configured to cross above the nose of the user only once at the lower ends thereof but not the upper ends thereof.

42. The eyewear of claim 1, wherein the frame comprises a dual bridge frame system having an interior structure that is adjustable relative to a head size of a user, and an exterior structure that is formed from a different material than the interior structure and is more rigid and stable than the interior structure.

43. The eyewear of claim 42, wherein the interior structure comprises the body and temples, and the exterior structure comprises a second frame configured to bridge, support and retain the optical lenses.

44. The eyewear of claim 43, wherein the nose suspension is configured to be mounted to the second frame.

45. The eyewear of claim 1, wherein the optical lenses are configured to be bridged away from the body and do not touch the body except where they are coupled and suspended downward from a center of the body.

46. The eyewear of claim 1, wherein the nose suspension is configured to be mounted directly to the lenses.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. Eyewear, comprising:
    a frame having a body and temples, and the frame is configured to support and retain optical lenses;
    a suspension system comprising bands mounted to the frame and configured to suspend the frame away from a user thereof, the suspension system comprising a nose suspension and ears suspensions, wherein the nose suspension is configured to contact a nose of the user and suspend the frame away from the nose of the user, and the ears suspensions are configured to contact ears of the user and suspend the frame away from the head and ears of the user;
    the nose suspension comprises only two of the bands and each ear suspension comprises only one of the bands, all of the bands are flexible, elastic in tension and consist of silicone, said only two bands of the nose suspension form an x-pattern, and each of said only two bands forms a linear span from end to end,
    each of the ears suspensions comprises only one of the bands having opposite ends, a first end of which has a first anchor mounted to a proximal portion of a respective temple, a second end of which has a second anchor mounted to a distal end of the respective temple, such that each ear suspension band forms a linear span from the first anchor to the second anchor on the respective temple; and
    said only two bands of the nose suspension are independent of and not directly joined to each other.

2. Eyewear, comprising:
    a frame having a body and temples, and the frame is configured to support and retain optical lenses;
    a suspension system mounted to the frame and configured to suspend the frame away from a user thereof, the suspension system comprising a nose suspension and ears suspensions, wherein the nose suspension is configured to contact a nose of the user and suspend the frame away from the nose of the user, and the ears suspensions are configured to contact ears of the user and suspend the frame away from the head and ears of the user;
    each of the nose suspension and the ears suspensions comprise silicone bands that are flexible and elastic, the nose suspension comprises only two of the silicone bands which form a bridge for the nose, each of said only two of the silicone bands of the nose suspension is in tension and forms a linear span from end to end, and each ear suspension comprises only one of the silicone bands that is in tension and has opposite ends, a first end of which has a first anchor mounted to a proximal portion of a respective temple, and a second anchor of which has a second anchor mounted to a distal end of the respective temple, such that each ear suspension band forms a linear span from the first anchor to the second anchor on the respective temple; and said only two of the silicone bands of the nose suspension are independent and not directly joined to each other.

3. Eyewear, comprising:

a frame having a body and temples, and the frame is configured to support and retain optical lenses;

a suspension system mounted to the frame and configured to suspend the frame away from a user thereof, the suspension system comprising a nose suspension and ears suspensions, wherein the nose suspension is configured to contact a nose of the user and suspend the frame away from the nose of the user, and the ears suspensions are configured to contact ears of the user and suspend the frame away from the head and ears of the user;

each of the nose and ears suspensions comprises a band, and each of the bands is flexible and elastic;

the nose suspension comprises only two of the bands which form an x-pattern and each of said only two of the bands is in tension and forms a linear span from end to end; and each ear suspension comprises only one f the bands, the band of each ear suspension is in tension, the band of each ear suspension has opposite ends, a first end of which has a first anchor mounted to a proximal portion of a respective temple, a second end of which has a second anchor mounted to a distal end of the respective temple, such that each ear suspension band forms a linear span from the first anchor to the second anchor on the respective temple.

4. The eyewear of claim 3, wherein each of the bands consists of silicone.

5. The eyewear of claim 3, wherein each of the bands consists of a spring.

6. The eyewear of claim 3, wherein each band has a non-uniform cross-sectional shape.

7. The eyewear of claim 3, wherein each of the bands of the ears suspensions is formed from a single material.

8. The eyewear of claim 3, wherein the anchors of each ear suspension consist of only two elastic anchors mounted to a respective one of the temples.

9. The eyewear of claim 3, wherein the body is formed from a single tube or wire that is coupled to a respective one of the temples on each end, the single tube or wire is configured to support and retain the optical lenses at upper and lower ends thereof, and the single tube or wire is configured to cross above the nose of the user only once at the lower ends thereof but not the upper ends thereof.

10. The eyewear of claim 3, wherein the frame comprises a dual bridge frame system having an interior structure that is adjustable relative to a head size of a user, and an exterior structure that is formed from a different material than the interior structure and is more rigid and stable than the interior structure.

11. The eyewear of claim 3, wherein the optical lenses are configured to be bridged away from the body and do not touch the body except where they are coupled and suspended downward from a center of the body.

12. The eyewear of claim 3, wherein the nose suspension is configured to be mounted directly to the lenses.

13. The eyewear of claim 1, wherein each ear suspension band forms and completes a closed loop with the respective temple.

14. The eyewear of claim 13, wherein each ear suspension band forms and completes a closed loop with the respective temple.

15. The eyewear of claim 13, wherein the first and second anchor of each ear suspension band comprises a tube.

* * * * *